Jan. 19, 1965     E. F. KEON     3,165,888

EXHAUST NOZZLE FOR REACTION ENGINES AND THE LIKE

Filed Sept. 18, 1959

INVENTOR
EDWARD F. KEON
BY H. Vincent Harsha

ATTORNEY

United States Patent Office 3,165,888
Patented Jan. 19, 1965

3,165,888
EXHAUST NOZZLE FOR REACTION ENGINES
AND THE LIKE
Edward F. Keon, Lowell, Mass., assignor, by mesne assignments, to the United States of America as represented by the Secretary of the Navy
Filed Sept. 18, 1959, Ser. No. 840,889
4 Claims. (Cl. 60—35.6)

This invention pertains generally to exhaust nozzles for reaction engines and the like, and more particularly to an improved exhaust nozzle capable of withstanding extremely high temperatures and providing a high degree of thermal insulation from the hot exhaust stream passing therethrough.

The prior art is replete with various nozzle structures which provide some measure of thermal insulation from the hot exhaust stream for structural members and other devices which must be mounted in close proximity to the nozzle. Further, the prior art affords many examples of structures which provide means for cooling the exhaust nozzle in order that the latter may withstand the extremely high heat encountered in the exhaust stream of hot gasses. Exemplary of such structures is the well-known nozzle structure which comprises a double-wall tubular member in which a coolant (either a coolant per se or, for example, the oxidizer employed in causing the combustion of the fuel in the combustion chamber) is passed between the two walls in order to cool the nozzle by conducting heat away from the hot inner wall. While such structures often provide satisfactory operation, they are generally cumbersome devices which add unnecessarily to the size and weight of the reaction engine or the like with which they are associated.

As will be appreciated by those skilled in the art, it is desirable to provide rocket nozzle structures which will not only be able to withstand the high temperatures involved in the operation of a reaction engine, but which will also provide a high degree of thermal insulation between the hot exhaust stream and devices which must be mounted in the near proximity of the exhaust nozzle. Such devices may take the form of electrical or electromechanical control devices for assisting in the operation of a vehicle driven by the reaction engine, or it may be that it is desired to provide thermal insulation for a mere mechanical structure, such as a strut or other support, such structure not being fabricated of a suitable high-temperature material. In any case, due to the rather universal need to conserve space in the construction of vehicles of the type usually driven by reaction engines, it is often desirable and sometimes necessary to mount thermally labile or unstable devices or structures in close proximity to the exhaust nozzle. It is therefore highly desirable to provide an exhaust nozzle of simplified construction which will be light in weight and small in size (as compared to the nozzles of the prior art which require additional means for providing cooling thereof), and which will provide a high degree of thermal insulation between the hot exhaust stream within the nozzle and thermally labile structures which are adjacent to the exterior of the nozzle.

The problem of controlling the flow of heat, whether with respect to the prevention of heat flow (as in the art of thermal insulation) or with respect to the enhancement of heat flow (in order to dissipate heat rapidly from a hot-spot or the like), is an old one, and the solutions therefor are numerous. The prior art affords many examples of heat-controlling members, some being characterized by rather low thermal conductivity so as to provide good thermal insulation between a heat source and an object which is to be protected therefrom, and others being characterized by rather high thermal conductivity so as to provide a ready avenue of heat dissipation for a heat source or hot-spot and to serve as a heat sink for the heat so conducted. The heat-controlling members of the prior art have generally fallen into either one or the other of these categories, being considered either a good thermal conductor or a good thermal insulator. For example, most high-temperature materials, such as tungsten, tantalum, molybdenum and the like, are good conductors of heat, and bodies of such materials readily serve as heat sinks and other heat dissipating means. A common example of a thermally insulating material is asbestos, which is available commercially in several forms. Another, and not so common, example of thermally insulating material is found in ablative plastics, which provide thermal insulation through the absorption of heat connected with the ablation of the plastic material.

In each of these materials of the prior art the thermal characteristics are substantially isotropic. In some instances, the difference between the thermal conductivities measured in mutually orthogonal directions is so small as to be practically unmeasurable, and even where the difference is measurable, the ratio of the two conductivities is on the order of only two-to-one, or even less. As a result of this lack of thermal anisotropy in the prior art materials, the heat-controlling members available in the past were either thermal insulators (as a result of their poor thermal conductivity) or dissipative heat sinks which absorb heat in conducting it away from a hot spot or the like (due to their good thermal conductivity). Therefore, no heat-controlling bodies have been available which would both insulate against heat flow and, at the same time, provide a means for dissipating heat by the rapid conduction thereof away from the source.

As is readily apparent, a tremendous advantage may be realized over the prior art by the use of a thermally anisotropic protective wall or the like between a heat source and a nearby object which is to be thermally insulated from such source. Where the anisotropic wall is positioned between the heat source and the protected object in the proper orientation, with its direction of poor thermal conductivity parallel with a line between the source and the object, and its direction of high thermal conductivity perpendicular to such line, heat emanating from the source not only is prevented from reaching the protected object, but the heat is dissipated by conduction away from the local area. Stated in an alternative manner, where it is desirable to confine the flow of heat from a source so that it flows in a desired direction without being dissipated by undesired flow in other directions, a properly-oriented body exhibiting thermal anisotropy will conduct this heat readily in the desired direction and also prevent its escape in other directions.

As will be appreciated by those skilled in the art, none of the substantially isotropic materials of the prior art provides a complete solution to the problems encountered with respect to the heat of exhaust nozzles. Where a good thermal insulator is employed, no dissipation of the heat is achieved, and where a good thermal conductor is utilized, no insulation is provided.

It is accordingly a primary object of the present invention to provide an improved exhaust nozzle for reaction engines and the like, wherein at least the inner surface of the nozzle exhibits a high degree of thermal anisotropy.

Another object of the invention is to provide an improved exhaust nozzle for reaction engines and the like, wherein the nozzle is constructed of a thermally anisotropic material.

An additional object of the invention is to provide an exhaust nozzle for reaction engines and the like, wherein the inner surface of the nozzle comprises a deposit of a thermally anisotropic material.

A further object of the invention is to provide, in combination, a thermally anisotropic exhaust nozzle for a reaction engine or the like and a thermally labile object which is to be thermally protected thereby.

In accordance with the present invention, the above and other objects are achieved by means of an exhaust nozzle at least the inner surface of which comprises pyrolytically-formed graphite. The pyrolytic graphite provides the desired thermal anisotropy, and the nozzle may comprise a body of this material or, alternatively, may comprise a suitable substrate having a deposit of pyrolytically-formed graphite thereon. While the pyrolytic deposition of graphite as a coating on a suitably inert substrate is not new, the present invention is the first disclosure of the use of pyrolytically-formed graphite in an exhaust nozzle for reaction engines and the like. In my copending application, Serial Number 835,618, now Patent No. 3,096,083, filed August 24, 1959, and assigned to the assignee of the present invention, there is the first disclosure of the extreme thermal anisotropy of pyrolytically-formed graphite. The discovery of such thermal anisotropy is the culmination of long and arduous research directed toward the provision of vastly improved heat-controlling bodies, and the present invention is the utilization of that discovery in a new use as applied to exhaust nozzles in order to provide a new and unobvious result in that art.

In making use of the pronounced thermal anisotropy of pyrolytically-formed graphite, the present invention provides a first practical success in the control of heat flow in exhaust nozzles in instances in which the requirements have been too extreme for the structures of the prior art to meet. For example, the extreme thermal anisotropy of the material of a nozzle in accordance with the present invention provides outstandingly superior insulation for nearby objects in comparison to the structures of the prior art, since heat from the exhaust stream is not only prevented from being conducted in the undesired direction, but is simultaneously dissipated by large thermal conduction in another direction. In achieving this new and unobvious result, the present invention utilizes concepts which have appeared disadvantageous to prior workers in the art.

Briefly, the present invention contemplates the provision of a heat-controlling and insulating exhaust nozzle for reaction engines and the like, at least the inner surface of the nozzle comprising pyrolytically-formed graphite, with the thermal anisotropy of the latter providing the desired thermal characteristics. In the method of forming the nozzle of the present invention, a tubular substrate of a suitably inert material, such as ordinary graphite, and having an inner surface of the desired converging-diverging shape corresponding to the shape of the nozzle to be made is heated to a temperature at least equal to the decomposition or cracking temperature of the carbonaceous gas that is to be employed (e.g., 2100 degrees centigrade). The carbonaceous gas is then flowed through the heated substrate (or at least a portion thereof) for a time sufficient to form a coating or deposit thereon of a desired thickness, and the deposit is then cooled. Where it is desired to provide a nozzle comprising a free-standing body of pyrolytically-formed graphite, the substrate is then removed. Where, on the other hand, it is desired to provide a nozzle comprising a deposit of pyrolytically-formed graphite on a substrate (as, for example, to provide increased mechanical strength), the substrate is merely left in position and the nozzle constitutes the pyrolytic graphite layer and its supporting member.

With the above considerations and objects in mind, the invention itself will now be described in connection with a preferred embodiment thereof given by way of example and not of limitation, and with reference to the accompanying drawings, in which.

Figure 1:
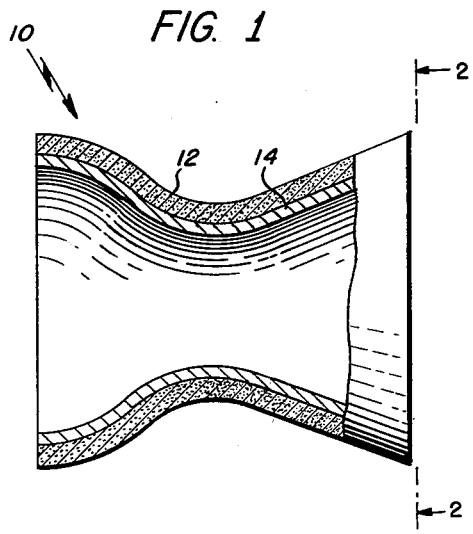
FIG. 1 is an elevation view in partial vertical section, showing an exhaust nozzle constructed in accordance with the present invention.

Referring now to FIG. 1, the numeral 10 indicates the exhaust nozzle in a general manner, such nozzle comprising a substrate 12 of ordinary graphite or the like, and a deposit 14 of pyrolytically-formed graphite thereon. The nozzle 10 has the characteristic shape of the converging-diverging or De Laval nozzle employed in connection with reaction engines in which an exhaust of heated gases is formed for expulsion through the nozzle. As the hot exhaust stream passes into the nozzle 10 at the left in FIG. 1, a compression is effected in the stream, and the gases are then allowed to expand as they are expelled from the nozzle at the right, providing the usual operation of the reaction engine. The exhaust port or expulsion end of nozzle 10 is shown in FIG. 2.

Figure 2:
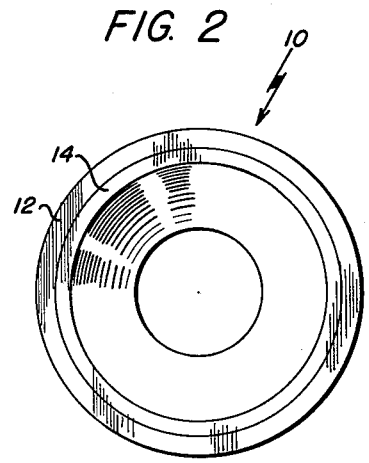
FIG. 2 is an end view of the nozzle of FIG. 1, taken on line 2—2 in that figure.

In the formation of the nozzle 10 of FIGS. 1 and 2, the substrate 12 is heated to at least the decomposition or cracking temperature of the particular carbonaceous gas that is to be employed in the pyrolytic deposition. Typical gases which may be employed for this purpose are methane, ethane, propane, benzene and carbon tetrachloride, all but the latter being hydrocarbon gases. As previously stated, a typical substrate material is ordinary graphite. With the substrate 12 at or above this critical temperature, a flow of the gas chosen is introduced into the interior of the substrate so as to evenly, or almost so, expose the interior surface of the substrate 12 to the flow of the gas. Due to the pyrolysis of the gas when it comes into contact with the heated substrate, pyrolytic graphite is deposited on the hot inner surface thereof, forming the deposit or layer 14. The temperature is maintained and the gas flow continued until a deposit of sufficeint thickness is achieved, and then the nozzle is cooled to complete the process.

Figure 3:
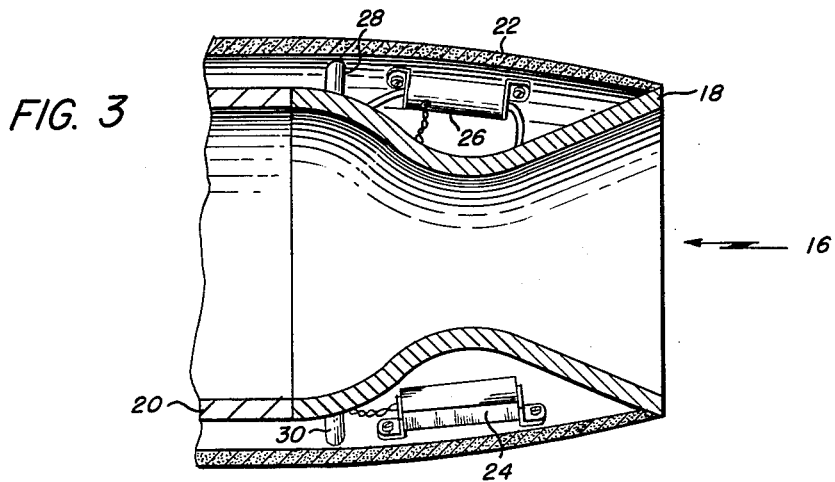
FIG. 3 is a vertical section of a preferred form of the exhaust nozzle of the present invention, shown in combination with other elements of a vehicle adapted to be driven by the reaction engine with which the exhaust nozzle is associated.

With the reference now to FIG. 3 of the drawings, a slightly different nozzle 16 is shown, the difference lying in the fact that nozzle 16 is a self-supporting or free-standing body, requiring no support member such as is shown in connection with nozzle 10 of FIGS. 1 and 2. Nozzle 16 of FIG. 3 comprises a tubular member 18 of typical converging-diverging cross-sectional area. The nozzle member 18 is adapted to be connected to the aft end of a combustion chamber 20 or the like, for receiving the exhaust stream of hot gases issuing therefrom. Where the combustion chamber 20 and the nozzle member 18 are to form a part of a vehicle such as a guided missile or a jet engine aircraft, the two will normally be housed in a streamlined outer body or nacelle 22. As is commonly the case, the body 22 will be of a size (relative to the components contained therein) such that there is a necessity for mounting the several internal components thereof in rather close proximity to each other. Among other things, this generally requires the mounting of thermally labile components adjacent to the exterior of the exhaust nozzle member 18. As is evident, where objects may be mounted adjacent the nozzle wall (instead of being spaced therefrom in order to achieve thermal protection), a significant saving in space or volume is effected with respect to the body 22. The thermally labile components referred to in this specification may be any of a wide variety of structures or devices whose operation or structural integrity may be adversely affected by the extremely high temperatures of the exhaust stream from the reaction engine. For example, the element which is to be thermally protected may be an electrical device or an electromechanical apparatus which performs a function in the control of the operation of the reaction engine or of the vehicle in which such engine is mounted. Further, the thermally labile device may merely be a structural member which is connected to the exhaust nozzle, as, for example, a strut or the like for the support of the nozzle member.

In FIG. 3, illustrative thermally labile devices which are to be protected from the heat of the exhaust stream are the electrical relay or the like 24, the electromechanical valve 26, and the support members 28 and 30. As is readily apparent, if the devices 24 and 26 are not thermally insulated from the heat of the exhaust stream passing through the nozzle member 18, their operation will certainly be adversely affected. Further, all of the members 24 through 30 may actually lose their structural integrity as a result of the application thereto of the high temperatures encountered in the exhaust stream passing through the exhaust nozzle 16. The thermal anisotropy of the pyrolytic graphite exhaust nozzle member 18 serves not only to prevent the conduction of heat radially outward from the center of the exhaust stream, but also dissipates such heat longitudinally of the stream so as to provide even more effective insulation for the protected parts.

As previously stated, many materials are characterized by a very small difference between their thermal conductivities in mutually orthogonal directions. In the materials of the prior art, the ratios of such thermal conductivities are quite small, being on the order of two-to-one or substantially less. In sharp contrast thereto, the material of the nozzle of the present invention is characterized by thermal anisotropies as great as five-hundred-to-one. As will be understood by those skilled in the art, this large degree of anisotropy represents a tremendous stride forward in the techniques of heat-flow control, the difference between the characteristics of nozzles formed in accordance with the present invention and those of the prior art being a difference of kind or basic nature, rather than merely one of degree. The research efforts expended in the achievement of the discovery of the present invention disclose that at elevated temperatures pyrolytically-formed graphite is, in one plane, a better conductor of heat than any solid material previously known, and in a plane perpendicular to such first plane such material is substantially the poorest thermal conductor known. At room temperatures, to be more specific, pyrolytic graphite is a much better thermal conductor than even copper or silver, and while the thermal conductivity of pyrolytic graphite decreases gradually with increasing temperature, such conductivity is still a very high value and the pyrolytic graphite remains structurally intact at temperatures above the melting points of copper and silver. In the "C" direction, on the other hand, the thermal conductivity of pyrolytic graphite is lower than that of most solid insulators over a wide temperature range, and at extremely high temperatures, it is even lower than that of fibrous thermal insulators. The two extremes of thermal conductivity are combined in a single body to present to the art for the first time a heat-controlling exhaust nozzle having such startlingly different characteristics. Concomitantly, the pyrolytic graphite nozzle of the present invention is substantially impervious to gases, thus providing obvious additional advantages.

As was also previously stated, the material of the nozzle of the present invention provides a thermally stabile structure even at the extremely high temperatures encountered. For example, nozzles fabricated in accordance with this invention have been subjected to an air-stabilized plasma jet of 10,000 degrees Fahrenheit for 30 seconds without noticeable structural deterioration. Another exemplary temperature-time measurement of the characteristics of this material is provided by the fact that such a nozzle was subjected to a rocket motor exhaust of 5700 degrees Fahrenheit for 65 seconds without noticeable structural deterioration. As will be understood by those skilled in the art, these temperature-time measurements are given merely by way of example, and the high-temperature characteristics of pyrolytic graphite should not be taken as fully defined by the data just given.

No complete and detailed explanation of the extreme thermal anisotropy of the material of the nozzle of the present invention will be made herein, since the behavior is not fully understood at present. However, the difference in the thermal conductivities is believed to be based upon the high degree of ordering of the elements of the crystalline lattice structure of the pyrolytically-deposited graphite. The elements of such lattice structure are disposed in layers which are all parallel to the substrate surface upon which the pyrolytic graphite is deposited, the parallel layers lying in directions which define what is termed the A-B plane. The thermal conductivity in the A-B plane is extremely high, while the thermal conductivity in the perpendicular or thickness direction (the C direction) is very low. Obviously, the "planes" referred to herein are not necessarily planar, since where the deposition is made upon a non-planar surface the crystal "planes" or layers conform to the shape of the substrate surface.

It is important to note that conditions under which the pyrolysis takes place must be carefully controlled in order to produce a body having good structural integrity. This is not to say that there is any one temperature, rate of gas flow, or other operating condition which must be adhered to in order to produce a satisfactory nozzle, since different temperatures, rates of gas flow, etc., as well as different combinations thereof, serve to produce different but satisfactory results for different requirements. What is important is that for a given set of operating conditions initially established, an effective control must be maintained thereover so as to prevent radical changes therein during the deposition. Typical faults that otherwise occur are surface blisters, internal bubbles and external "whiskers" or fragments. As a result of this need for control of the operating conditions, it is generally desirable to perform the deposition in a sutiably closed container from which the air has been expelled prior to the introduction of the carbonaceous gas.

The invention has been described above in some detail, and particularly with reference to its application to the formation of a converging-diverging exhaust nozzle. However, it will be apparent to those skilled in the art that the invention is also applicable to exhaust nozzles of other shapes. In addition, the exhaust nozzle of the invention need not necessarily be associated with a reaction engine, but may be utilized in any application wherein it is required to provide means for directing the flow of a heated fluid medium, with such means also being required to provide thermal insulation from the heat of such medium. Further, the thickness of the deposited graphite may be made to be non-uniform along the length of the nozzle (in order, for example, to meet particular structural requirements) by selectively exposing areas of the substrate surface to different amounts of the carbonaceous gas, as by moving a spray of such gas along the deposit surface in a programmed manner. Hence, the invention is not to be considered as limited to the particular details given, nor to the specific application to which reference has been made during the description of the invention, except insofar as may be required by the scope of the appended claims.

What is claimed is:

1. An improved reaction engine exhaust nozzle comprising a tubular member for directing the flow of a hot propellant medium therethrough, the inner surface of said tubular member being first convergent and then divergent along the length thereof in the direction of such flow in order to compress and subsequently expand such hot propellant medium, said tubular member constituting a tubular substrate and a deposit of pyrolytically-formed graphite on the inner surface thereof, providing high thermal conductivity along such surface and low thermal conductivity through the thickness of said member.

2. In a reaction engine, means for producing a flow of a hot propellant medium, nozzle means having a converging-diverging inner surface for directing the flow of such hot medium, and thermally labile means forming a part of such engine and mounted adjacent the exterior of said nozzle means, said nozzle means constituting a body of pyrolytically-formed graphite the A–B crystal structure plane of which is substantially parallel to said inner surface, providing high thermal conductivity along such surface and low thermal conductivity through the thickness of said nozzle.

3. A method for making an improved reaction engine exhaust nozzle having a tubular member for directing the flow of a hot propellant medium therethrough, the inner surface of said tubular member being first convergent and then divergent along the length thereof in the direction of such flow in order to compress and subsequently expand such hot propellant medium which comprises forming said inner surface by heating an inert base member having a surface substantially corresponding to said inner surface of said tubular member to a temperature not less than the temperature of decomposition of a carbonaceous gas, and immersing said heated base member in an atmosphere of such gas to form a deposit of pyrolytic graphite thereon.

4. A method for making an improved reaction engine exhaust nozzle having a tubular member for directing the flow of a hot propellant medium therethrough, the inner surface of said tubular member being first convergent and then divergent along the length thereof in the direction of such flow in order to compress and subsequently expand such hot propellant medium which comprises forming said tubular member by heating an inert base member having a surface substantially corresponding to said inner surface of said tubular member to a temperature not less than the temperature of decomposition of a carbonaceous gas, immersing said heated base member in an atmosphere of such gas for a period sufficient to form a deposit thereon of a self-supporting thickness, and thereafter removing said base member.

References Cited by the Examiner

UNITED STATES PATENTS

| | | | |
|---|---|---|---|
| 2,487,588 | 11/49 | Price | 60—35.6 |
| 2,614,947 | 10/52 | Heyroth | 23—209.2 |
| 2,618,032 | 11/52 | Traenkner. | |
| 2,789,038 | 4/57 | Bennet et al. | 23—209.1 |
| 2,817,605 | 12/57 | Sanz et al. | 23—209.3 |

FOREIGN PATENTS 947,656  1/49  France.

SAMUEL LEVINE, *Primary Examiner.*

ABRAM BLUM, *Examiner.*